(12) United States Patent
Hershenson

(10) Patent No.: US 6,938,067 B2
(45) Date of Patent: Aug. 30, 2005

(54) SYSTEM AND METHOD OF TRANSCODING A TELEPHONE NUMBER FROM A WEB PAGE

(75) Inventor: Matthew J. Hershenson, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 145 days.

(21) Appl. No.: 10/236,432

(22) Filed: Sep. 5, 2002

(65) Prior Publication Data

US 2003/0091166 A1 May 15, 2003

Related U.S. Application Data

(60) Provisional application No. 60/317,476, filed on Sep. 5, 2001.

(51) Int. Cl.[7] .............................................. G06F 15/16
(52) U.S. Cl. ...................... 709/202; 709/203; 709/217; 709/227; 709/245
(58) Field of Search ................................ 709/202–203, 709/217–219, 225–229, 245–246; 707/10, 104.1; 455/414.1–414.3, 456.2, 566; 345/810, 864; 379/201.01, 201.05

(56) References Cited

U.S. PATENT DOCUMENTS

| 5,859,636 | A | | 1/1999 | Pandit |
| 6,266,539 | B1 | * | 7/2001 | Pardo ...................... 455/556.2 |
| 6,338,085 | B1 | * | 1/2002 | Ramaswamy ............... 709/217 |
| 6,421,733 | B1 | | 7/2002 | Tso et al. |
| 6,519,616 | B1 | * | 2/2003 | Zamora-McKelvy et al. ........................... 709/217 |
| 6,564,254 | B1 | * | 5/2003 | Shoji et al. ................. 709/217 |
| 6,570,871 | B1 | | 5/2003 | Schneider |
| 6,674,453 | B1 | * | 1/2004 | Schilit et al. ............... 345/810 |
| 6,728,731 | B2 | * | 4/2004 | Sarukkai et al. ......... 707/104.1 |
| 6,788,769 | B1 | * | 9/2004 | Waites ........................ 709/206 |
| 6,834,048 | B1 | * | 12/2004 | Cho et al. ................... 370/356 |
| 2003/0014488 | A1 | * | 1/2003 | Dalal et al. ................. 709/204 |
| 2003/0023424 | A1 | * | 1/2003 | Weiner .......................... 704/8 |
| 2003/0026289 | A1 | * | 2/2003 | Mukherjee et al. ......... 370/466 |

FOREIGN PATENT DOCUMENTS

WO    WO 98/43177    10/1998

OTHER PUBLICATIONS

Schilit/Trevor/Hilbert/Koh, "m–Links: An Infrastructure for Very Small Internet Devices", ACM Fuji–Xerox Palo Alto Laboratory, pp. 122–131, published by ACM Sigmobile Jul. 1, 2001 in Rome, Italy.

Handley/Schulzrinne/Schooler/Rosenberg, "SIP: Session Initiation Protocol", Internet Draft—Internet Task Force, pp. 1–129, published by The Internet Society, Jun. 5, 2000 USA.

* cited by examiner

*Primary Examiner*—Bharat Barot
(74) *Attorney, Agent, or Firm*—Blakely, Sokoloff, Taylor & Zafman, LLP

(57) ABSTRACT

A system and method of transcoding a telephone number from a Web page is disclosed. First a Web page that includes a telephone number is received. The telephone number is then identified. The Web page is then edited to convert the identified telephone number to a link to a dialing application.

12 Claims, 7 Drawing Sheets

SYSTEM AND METHOD OF TRANSCODING A TELEPHONE NUMBER FROM A WEB PAGE

CLAIM OF PRIORITY

The present application claims priority from a U.S. provisional application entitled "System and Method Of Transcoding A Telephone Number From A Web Page", Application No. 60/317,476, filed Sep. 5, 2001.

FIELD OF THE INVENTION

The present invention relates to viewing the Internet and more specifically to a system and method of automatically extracting information from an Internet Web page.

BACKGROUND OF THE INVENTION

The Internet has a very large number of Web pages. The Web pages can include all types and sorts of information. One very common use of Web pages is for a Web page owner, such as a business, to include product information, product ordering applications and information about the business. The information about the business often includes contact information such as name, address, telephone and facsimile numbers and other information.

FIG. 1 shows a typical contact information Web page and the Web page includes a title 105 and a contact information box 110. The contact information box 110 includes the street address 155, the city and state 120, the nine digit zip or postal code 125, a telephone number 130, a facsimile number 135, and an email address 140.

Web pages are often viewed through various devices such as a personal computer, a lap top computer, a Web-enabled telephone, a Web-enabled television (i.e. WebTV, etc), a Web-enabled personal digital assistant (PDA) or palm-sized computer and many other devices. Many of the devices used to view Web pages are multifunction and/or combination devices that have additional functions other than viewing Internet Web pages.

SUMMARY OF THE INVENTION

A system and method of transcoding a telephone number from a Web page is disclosed. First a Web page that includes a telephone number is received. The telephone number is then identified. The Web page is then edited to convert the identified telephone number to a link to a dialing application.

In an alternative embodiment, when the link is selected, the dialing application is automatically activated to dial the identified telephone number.

BRIEF DESCRIPTION OF THE DRAWINGS

The present invention is illustrated by way of example and not limitation in the figures of the accompanying drawings in which like references indicate similar elements.

DETAILED DESCRIPTION

As will be described in more detail below, a system and method for analyzing a Web page to detect telephone numbers that are included in the Web page is described. A detected telephone number in the Web page is then converted to a link to a dialing application such that when the link is selected, the detected telephone number is automatically dialed. Alternatively, converting the detected telephone number can also include converting the detected telephone number to a link to a facsimile application. In other alternatives, the conversion of the detected telephone number can be accomplished in either a server or a user terminal/client computer. Alternatively, the modified Web page that includes the converted telephone number can then be downloaded to a user terminal that has also a dialing application. When the converted telephone number is selected, the dialing application is activated and directly dials the detected telephone number.

For example, in one embodiment, where the user terminal is a Web-enabled telephone, a server analyzes the Web page to detect a telephone number and then modifies the Web page to include the converted telephone number/link. Then, the modified Web page is downloaded to the Web-enabled telephone. When the converted telephone number/link is selected the dialing application of the Web-enabled telephone is automatically activated and the detected telephone number is automatically dialed by the telephone dialing application of the Web-enabled telephone. The user can then speak to the person at the other end of the telephone connection.

Figure 2:
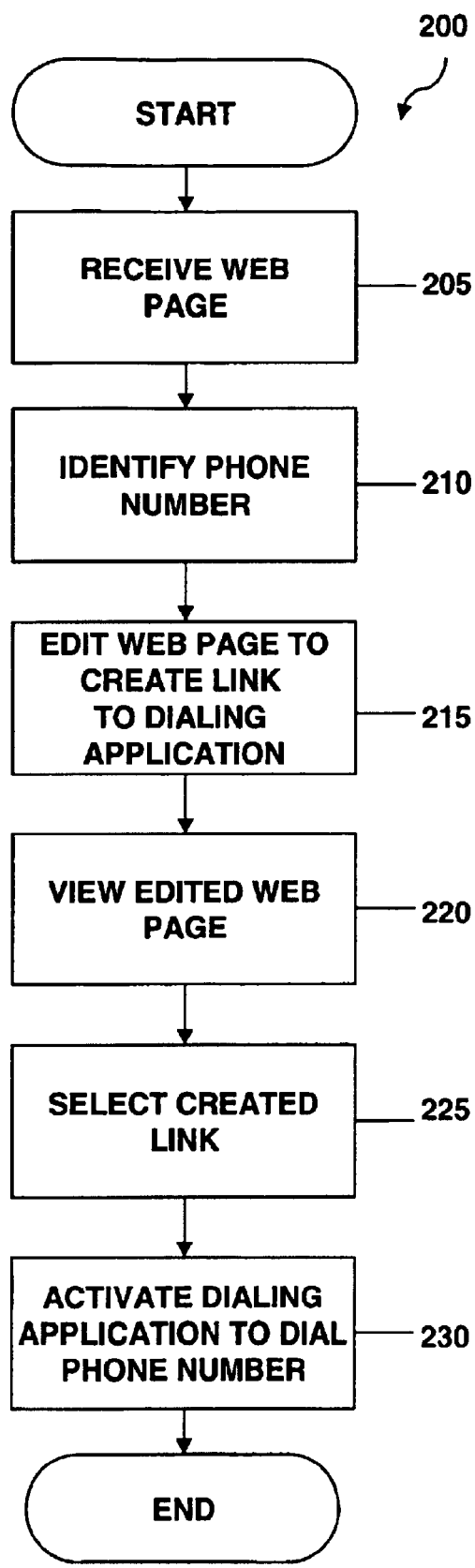
FIG. 2 illustrates one embodiment of a process for converting a telephone number on a Web page to a link.

FIG. 2 illustrates one embodiment of a process for converting the telephone numbers on a Web page. Note that as used herein a telephone number can include any number that is used to identify a connection on the telephone network such as telephone numbers, facsimile numbers and telex numbers or other types of connections to the telephone network. First, in a block 205, the Web page is received. Next in a block 210, the telephone numbers from the Web page are identified. Then, in a block 215, the Web page is edited to create links or a link to a dialing application for each of the telephone numbers that are identified. The link includes the code necessary to activate the dialing application and the actual detected telephone number data for the dialing application to process. Next, in block 220, the edited Web page is viewed. The created link is selected in a block 225, and in a block 230, the dialing application is activated to dial the detected telephone number from the link.

Figure 1:
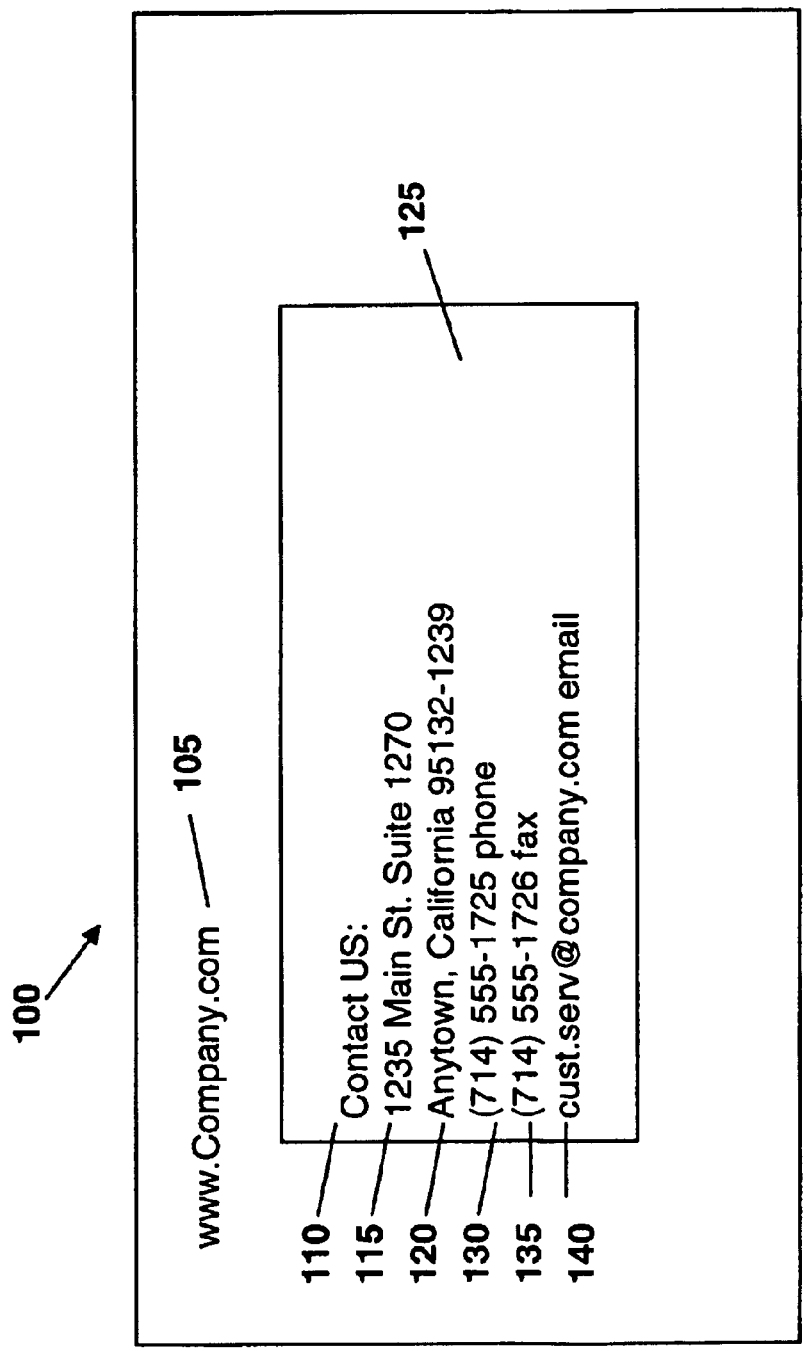
FIG. 1 shows a typical Web page from the Internet.

Returning to the example Web page shown in FIG. 1, the process 200 would identify both the telephone number 130 and the fax number 135 and create links for each of the telephone number 130 and the fax number 135. When a link is selected, the dialing application automatically dials the respective telephone 130 or fax number 135.

In one alternative embodiment, the process 200 could also include a process of analyzing text adjacent to the detected telephone number for specific text strings such as "fax", "ph", "phone", "telex" and other text strings that can be used to identify the type of telephone number, i.e., telephone, facsimile or telex. For example, if a facsimile number is detected (i.e. some form of the term "fax" is identified adjacent to the detected fax number), then a fax application is automatically activated when the respective link is selected. Activating the fax application allows the user to automatically create a fax document and, when the fax document is completed, to easily send the completed fax document to the selected fax number. Similarly, a telex application could be activated and a telex message could be prepared and sent. Of course, in either the facsimile or telex examples described above, the facsimile or telex messages could be prepared before the converted telephone number/link is selected and once the facsimile/telex application is activated, the previously prepared message is then selected and sent.

In one embodiment, identifying the telephone numbers includes a method of comparing number strings. As shown on FIG. 1, there are several number strings such as the address 115, the zip code 125, the telephone number 130 and the fax number 135. Each of the number strings include significant numbers and significant formats of numbers.

Figure 2A:
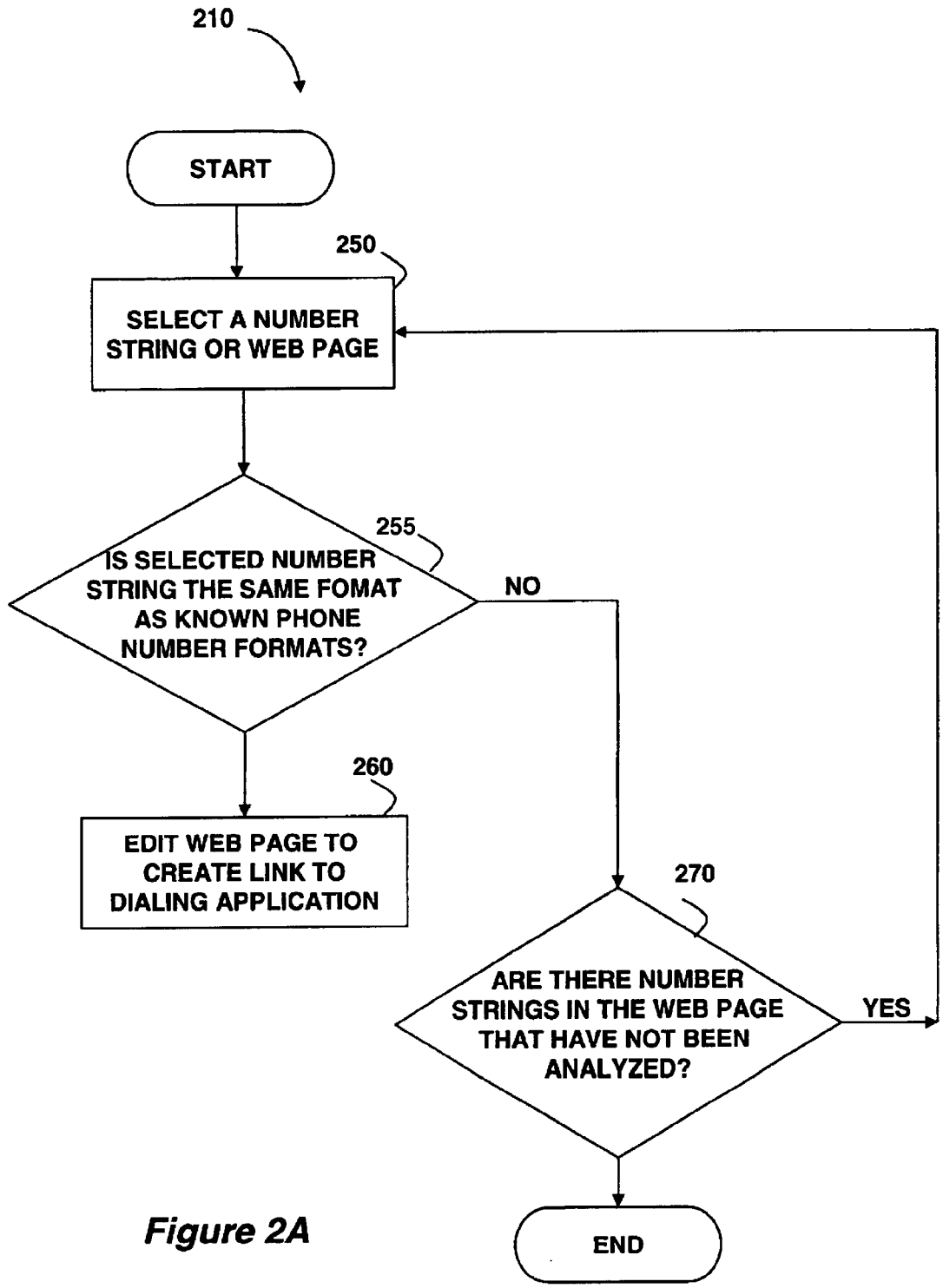
FIG. 2A illustrates one embodiment of a process of identifying telephone numbers.

FIG. 2A illustrates one embodiment of a process of identifying telephone numbers such as shown in block 210 of FIG. 2. A number string from the Web page is selected in a block 250. Then, the selected number string is analyzed to determine if the number string has the same format as one of a number of known telephone number formats in block 255. The telephone number formats can include a nine-digit or ten-digit U.S. telephone number in the format of "XXX-XXX-XXXX" or "1-XXX-XXX-XXXX", respectively. Alternative formats can include punctuation such as parentheses, hyphens, periods and other punctuation. In addition, international telephone number formats can also be included. In one alternative, the selected number string is compared to a database of telephone number formats.

If, in block 255, the selected number string is not the same format as one of the known telephone number formats, then the process continues at block 270. In block 270, the Web page is further analyzed for additional number strings that not yet been tested. If there are additional number strings, then the process returns to block 250 to select a next number string. If in block 270, there are no additional number strings, then the process ends. If, in block 255, the selected number string is the same format as a known telephone number format, then the Web page is automatically edited to create a link to the dialing application in block 260. Then the process continues at block 270 as described above.

In one embodiment of the process shown in FIG. 2, the Web page is received (block 205) and analyzed (block 210) and edited (block 215) in a server rather than in a client computer or user terminal. In addition, the edited Web page is then output to a client computer and the client computer views the Web page (block 220). When the link is selected in the client computer, the dialing application in the client computer is activated to dial a telephone number.

In another embodiment, the dialing application can also be included in the server. For example the Web page is received (block 205) and analyzed (block 210) and edited (block 215) in the server and then output to a client computer. The client computer also includes audio circuitry and software such as voice over IP or some other voice-audio protocol to allow the client computer to send and receive audio to the server. Then, when the link is selected in the client computer, the server activates the dialing application to complete the telephone call.

In another embodiment, the dialing application can include an application for automatically storing the detected telephone number in a database such as a personal information manager ("PIM") or similar application.

In yet another application the processes described in one or both of FIGS. 2 and 2A above can be a "plug-in" application in a Web browser application.

Figure 3:
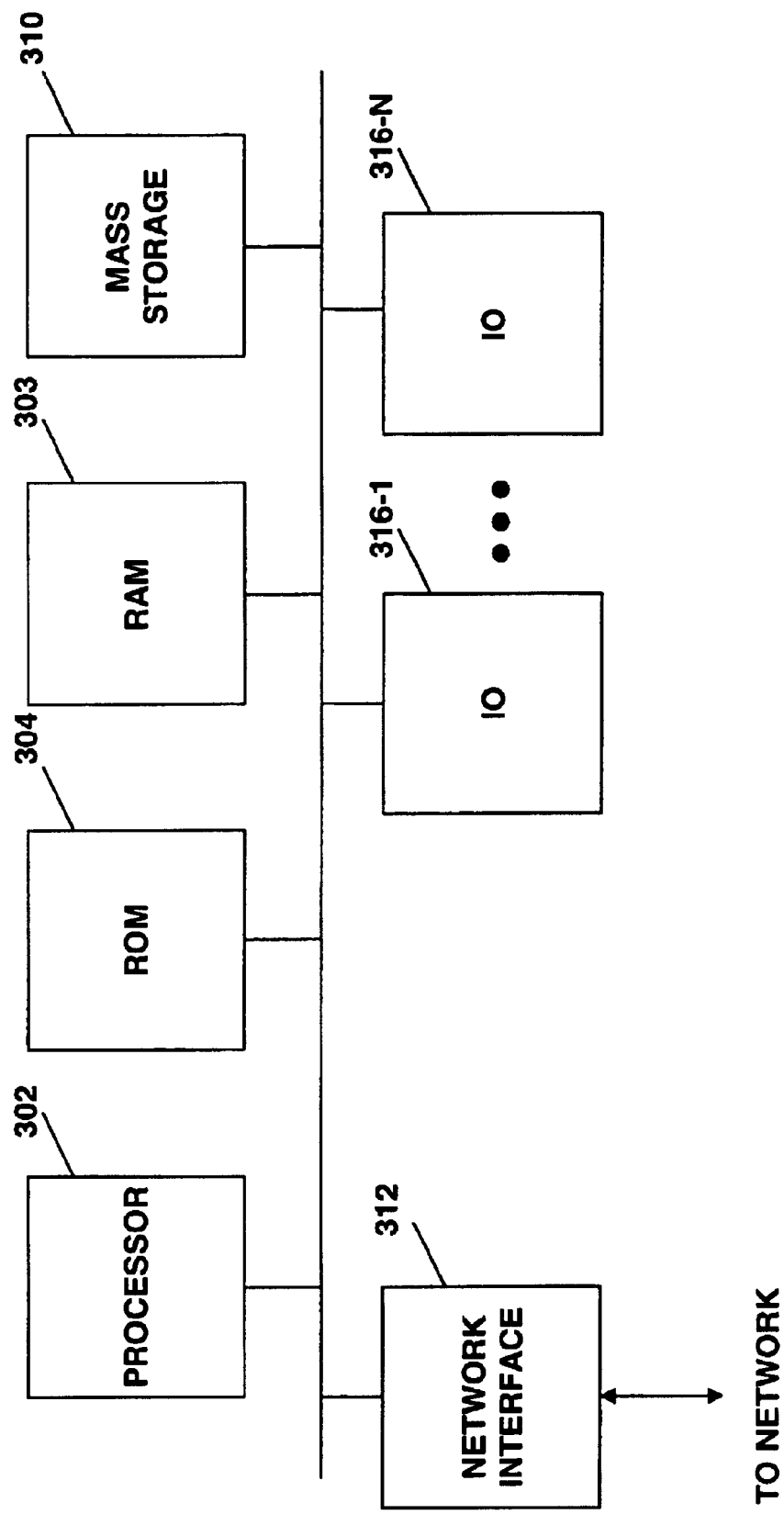
FIG. 3 is a high-level block diagram of a computer system.
Figure 4:
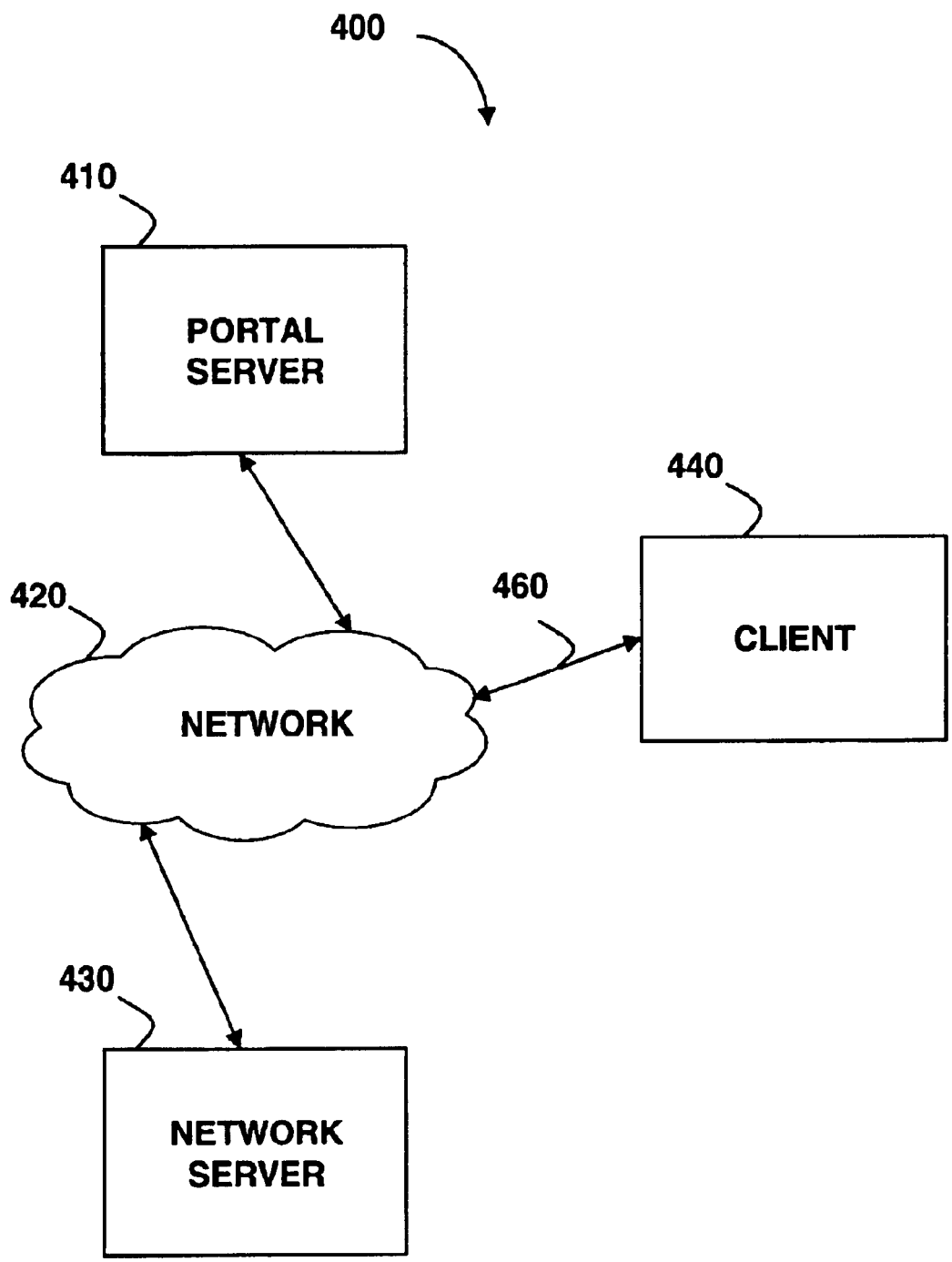
FIG. 4 shows a computer network system.

FIG. 3 is a high-level block diagram of a computer system representative of any or all of the client 440 or the servers, i.e., network server 430 and portal server 410, shown in FIG. 4. As shown, the computer system includes a processor 402, ROM 404, and RAM 406, each connected to a bus system 408. The bus system 408 may include one or more buses connected to each other through various bridges, controllers and/or adapters, such as are well known in the art. For example, the bus system 408 may include a "system bus" that is connected through an adapter to one or more expansion buses, such as a Peripheral Component Interconnect (PCI) bus. Also coupled to the bus system 408 are a mass storage device 410, a network interface 412, and a number (N) of input/output (I/O) devices 416-1 through 416-N.

I/O devices 416-1 through 416-N may include, for example, a keyboard, a pointing device, a display device and/or other conventional I/O devices. Mass storage device 410 may include any suitable device for storing large volumes of data, such as a magnetic disk or tape, magneto-optical (MO) storage device, or any of various types of Digital Versatile Disk (DVD) or Compact Disk (CD) based storage.

Network interface 412 provides data communication between the computer system and other computer systems such as via the network 420 of FIG. 4. Hence, network interface 412 may be any device suitable for or enabling the computer system 400 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

Of course, many variations upon the architecture shown in FIG. 3 can be made to suit the particular needs of a given system. Thus, certain components may be added to those shown in FIG. 3 for given system, or certain components shown in FIG. 3 may be omitted from the given system.

Elements of the present invention may be included within a client-server based architecture such as illustrated in FIG. 4. A portal server 480 communicates with clients 440 and other network servers 430 over a network 420 (e.g., the Internet). The network 420 over which the clients 440 and servers 480, 430 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 420 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 480 in one embodiment includes a user database for storing various types of user configuration and account data. Users may register and login to the portal server 480 from a client 440 by specifying a user ID and/or password. According to one embodiment, a user connects to the servers 480, 430 via a browser application such as Netscape Navigator™ or Microsoft Internet Explorer™ which communicates via the Hypertext Transfer Protocol (hereinafter "HTTP").

In one embodiment, users may configure the portal server 480 to retrieve and manage specific types of information. For example, a user may configure the portal server 480 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 430) on behalf of the user.

In addition to information retrieval and management, in one embodiment the portal server 480 also provides application services such as email, online scheduling (e.g., appointments, to-do lists, etc), instant messaging, contact management, word processing and a variety of other online services. Users may access these services by logging in to the portal server 480 with a valid user ID and password. In one embodiment, the portal server 480 generates a unique, personalized Web page for each user containing links to all, or a subset of, the information and/or services subscribed to by the user.

Figure 5:
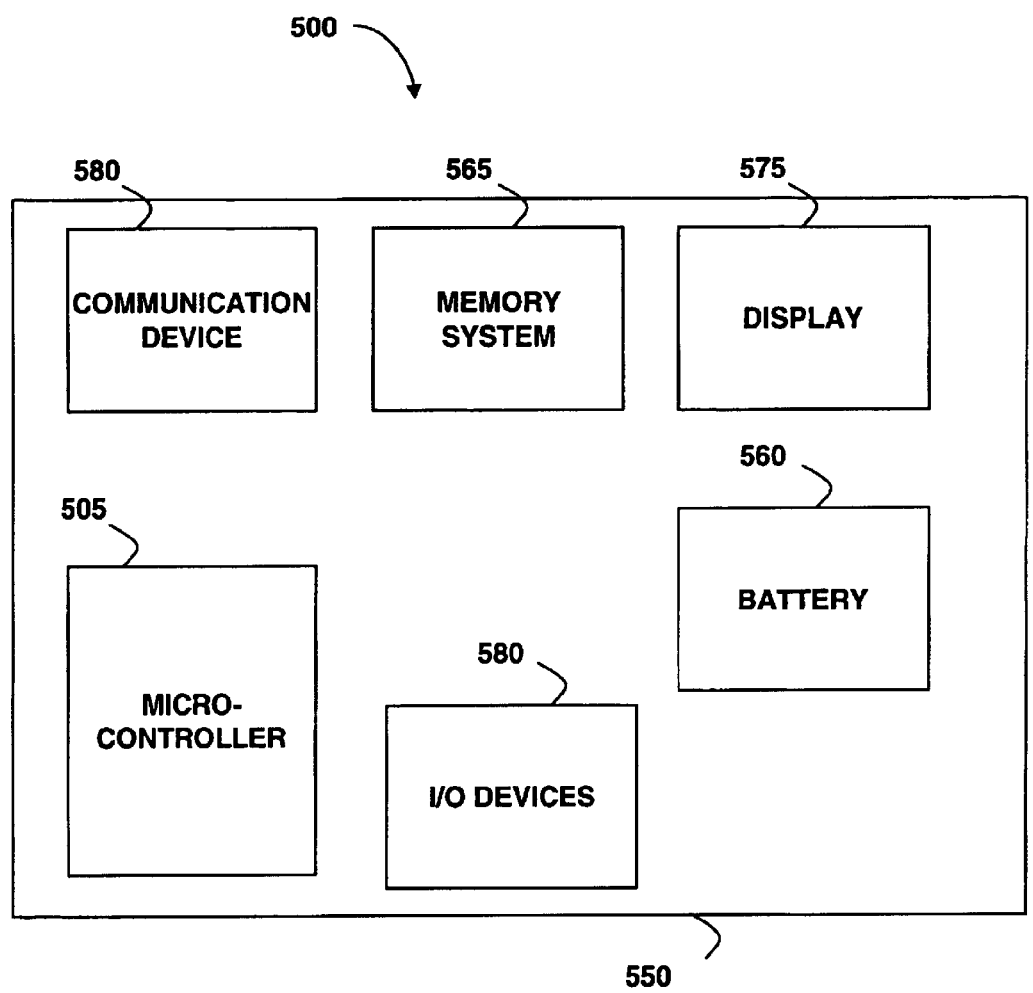
FIG. 5 shows illustrates one embodiment of a client computing device.

FIG. 5 illustrates one embodiment of a client computing device. The client computing device 500 includes a microcontroller 505, an external memory 565, a display 575, various I/O devices 580 such as a keyboard, and a battery 560. The external memory 565 may be used to store programs and/or portal data 565 transmitted to the client computing device 500 from the portal server 510 (e.g., via client 440). In one embodiment, the external memory 565 is non-volatile memory (e.g., an electrically erasable programmable read only memory ("EEPROM"); a programmable read only memory ("PROM"), etc). Alternatively, the memory 565 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the client computing device 550 will notify the user and/or the portal server 410. The portal server 410 in one embodiment will then automatically send the user a new battery.

The microcontroller 505 of one embodiment is comprised of a central processing unit ("CPU"), a read only memory ("ROM"), and a scratchpad RAM. The ROM is further comprised of an interpreter module and a toolbox module.

The toolbox module of the ROM contains a set of toolbox routines for processing data, text and graphics on the client computing device 500. These routines include drawing text and graphics on the client computing device's display 575, decompressing data transmitted from the portal server 410, reproducing audio on the client computing device 500, and performing various input/output and communication functions (e.g., transmitting/receiving data over the client link 460). A variety of additional client computing device functions may be included within the toolbox while still complying with the underlying principles of the invention.

In one embodiment, microprograms and portal data are transmitted from the portal server 410 to the external memory 565 of the client computing device via a communication interface under control of the microcontroller 505. Various communication interfaces may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module before being executed by the microcontroller 505. One of the benefits of this configuration is that when the microcontroller portion of the client computing device 500 is upgraded (e.g., to a faster and/or less expensive model), only the interpreter module and toolbox of the ROM needs to be rewritten to interpret the currently existing bytecodes for the new microcontroller 505. In addition, this configuration allows client computing devices 500 with different CPUs to coexist and execute the same microprograms. Moreover, programming frequently-used routines in the ROM toolbox module reduces the size of microprograms stored in the external memory 565, thereby conserving memory and bandwidth over the client link 460. In one embodiment, new interpreter modules and/or toolbox routines may be developed to execute the same microprograms on cellular phones, personal information managers ("PIMs"), or any other device with a CPU and memory.

One embodiment of the ROM may be comprised of interpreted code as well as native code written specifically for the microcontroller CPU. More particularly, some toolbox routines may be written as interpreted code (as indicated by the arrow between the toolbox and the interpreter module) to conserve memory and bandwidth for the same reasons described above with respect to microprograms. Moreover, in one embodiment, data and microprograms stored in external memory 565 may be configured to override older versions of data/microprograms stored in the ROM (e.g., in the ROM toolbox).

The client computing device 500 may communicate with the portal server 480 (discussed above) using various RF communication techniques.

In one embodiment, the RF communication is established through the communication device 580. In one embodiment, the communication device 580 includes a cellular telephone module that includes a full function cellular telephone that the microcontroller 505 may access for establishing a wireless link to the portal server 410. The communication device 580 can also include any other similar RF receiver/transmitter combination that will allow the microcontroller 505 to establish a link to the portal server 410 or other network server such as netwrok server 430. For example, in one particular embodiment, the client computing device 500 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the client computing device is capable of exploiting normally unused bandwidth on a nation-wide, analog cellular network. Embodiments of the client computing device may also be configured to transmit/receive data using a variety of other communication standards including 2-way paging standards and third generation ("3G") wireless standards (e.g., UTMS, CDMA 2000, NTT DoCoMo, . . . etc).

As indicated in FIG. 5, one embodiment of the client computing device 500, the CPU 505 employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the client computing device 500 while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 6:
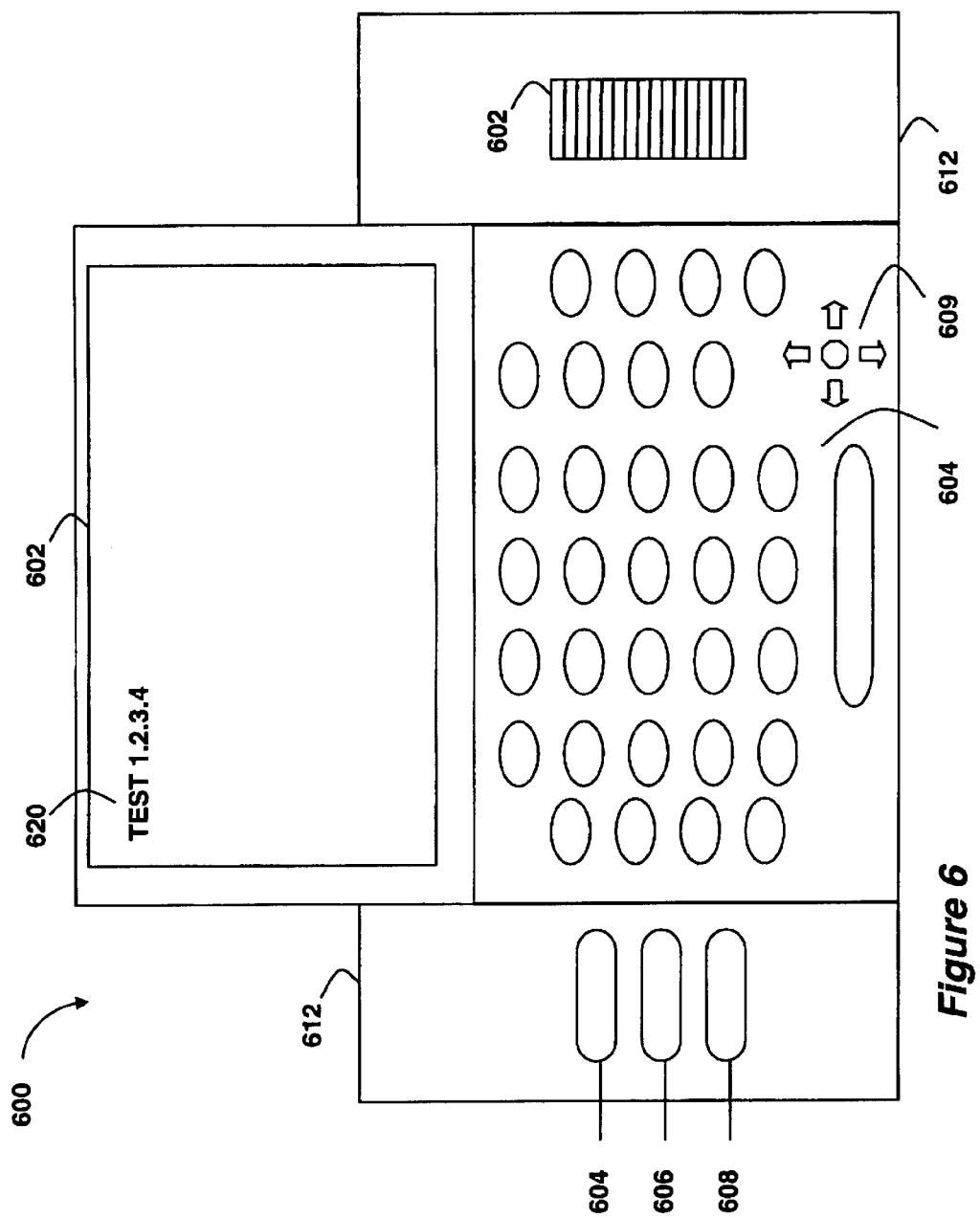
FIG. 6 illustrates an embodiment of a handheld keyboard and display device.

FIG. 6 illustrates an embodiment of a handheld keyboard and display device such as may be used as the client computing device of FIG. 5. The handheld keyboard and display device 600 can also include additional user interface devices such as a pointing device, selection buttons 604, 606, 608 and other user interface devices such as joysticks, mice, trackballs, or trackpoint 610.

In one embodiment, the display 602 rotates about a pivot 612. For example, FIG. 6 shows one embodiment of the keyboard and display device in the open position so that the keyboard 614 is accessible. When the display 602 is rotated 180 degrees about the pivot 612, to the closed position, the keyboard 614 is substantially covered.

In one embodiment, the display 602 is a liquid crystal display, or other similar monochrome or color display devices. The display 602 can also include a scratch resistant display surface such as glass or polycarbonate or other scratch resistant coating or outer layers as are known in the art. In one embodiment, the display also includes a removable transparent cover to protect the display screen. The transparent cover can also be a disposable cover. In one embodiment, the display 602 can also include a touch screen.

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 410, alternative embodiments of the invention may include numerous different servers (e.g., database servers, Web servers, etc), and/or mirrored servers distributed across a network. Moreover, while the embodiments described above focus on a client computing device, which executes interpreted code (e.g., Java byte codes), the principles of the invention may also be implemented on devices, which execute non-interpreted code. Accordingly, the scope and spirit of the invention should be judged in terms of the claims that follow.

One skilled in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

It will be further appreciated that the instructions represented by the blocks in FIGS. 2–2A are not required to be performed in the order illustrated, and that all the processing represented by the blocks may not be necessary to practice the invention In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of transcoding a telephone number comprising:

receiving a Web page requested from a data processing device at a server, wherein the Web page includes a telephone number;

identifying the telephone number;

editing the Web page in the server including converting the telephone number to a link to a dialing application on the data processing device, wherein selecting the link activates the dialing application to dial the telephone number; and transmitting the edited Web page from the server to the data processing device.

2. The method of claim 1 wherein identifying the telephone number includes comparing the telephone number to a plurality of telephone number formats.

3. The method of claim 1 further comprising:

detecting that the created link has been selected on the data processing device; and responsively activating the dialing application to dial the identified telephone number.

4. A system for transcoding a telephone number comprising:

a server;

a processor in the server;

a storage facility coupled to the processor and containing instructions executable by the processor which cause the processor to:

receive a Web page requested from a data processing device wherein the Web page includes a telephone number;

identify the telephone number; and edit the Web page including converting the telephone number to a link to a dialing application on the data processing device, wherein selecting the link causes the dialing application to dial the telephone number; and transmit the edited Web page to the data processing device.

5. The system of claim 4 further comprising a network coupled to the processor.

6. The system of claim 5, wherein the data processing device is coupled to a telephone network.

7. A method comprising:

receiving at a server a Web page requested from a data processing device;

analyzing, at the server, the Web page requested by the user to identify telephone numbers within the Web page;

generating, at the server, a link to a dialing function on the data processing device for one or more of the identified telephone numbers;

embedding the link within the Web page;

transmitting the Web page including the embedded link to the data processing device; and activating the dialing function responsive to detecting that the user has selected the link.

8. The method as in claim 7 wherein the dialing function is triggered by a dialing application executed on the data processing device.

9. The method as in claim 8 wherein the dialing application is a fax application.

10. The method as in claim 7 wherein the user requests the Web page from a client device, the method further comprising:

receiving the request for the Web page at a first server, the first server retrieving the Web page from a second server on behalf of the client, wherein the first server then generates the link to the dialing function after analyzing the Web page.

11. The method as in claim 10 wherein activating the dialing function responsive to detecting that the user has selected the link occurs at the client device.

12. The method as in claim 11 Wherein the client device is a data processing device telephone with telephony capabilities.

* * * * *